United States Patent
Taguchi

(10) Patent No.: US 8,008,219 B2
(45) Date of Patent: Aug. 30, 2011

(54) OPTICAL GLASS AND OPTICAL ELEMENT

(75) Inventor: Yoshihito Taguchi, Amagasaki (JP)

(73) Assignee: Konica Minolta Opto, Inc., Tokyo (JP)

( * ) Notice: Subject to any disclaimer, the term of this patent is extended or adjusted under 35 U.S.C. 154(b) by 64 days.

(21) Appl. No.: 12/462,117

(22) Filed: Jul. 28, 2009

(65) Prior Publication Data

US 2010/0035743 A1    Feb. 11, 2010

(30) Foreign Application Priority Data

Aug. 6, 2008    (JP) .................................. 2008-202883

(51) Int. Cl.
*C03C 3/19*    (2006.01)
(52) U.S. Cl. ................. 501/47; 501/45; 501/46; 501/48
(58) Field of Classification Search .................... 501/47, 501/45, 46, 48
See application file for complete search history.

(56) References Cited

U.S. PATENT DOCUMENTS

| 4,940,677 | A | * | 7/1990 | Beall et al. | ....................... 501/45 |
| 5,256,604 | A | * | 10/1993 | Aitken | ............................ 501/45 |
| 5,668,066 | A | * | 9/1997 | Oguma et al. | .................. 501/45 |
| 2005/0188724 | A1 | * | 9/2005 | Ikenishi et al. | .................... 65/31 |

FOREIGN PATENT DOCUMENTS

| JP | 02-124743 | 5/1990 |
| JP | 2002-211949 | 7/2002 |
| JP | 2004-217513 | 8/2004 |
| JP | 2005-053749 | 3/2005 |
| JP | 2007-145613 | 6/2007 |

* cited by examiner

Primary Examiner — Karl E Group
Assistant Examiner — Elizabeth A Bolden
(74) Attorney, Agent, or Firm — Brinks Hofer Gilson & Lione

(57) ABSTRACT

An optical glass includes, based on the total weight of the optical glass: not less than 35 weight percent and less than 45 weight percent of $P_2O_5$; not less than 0.5 weight percent and less than 10 weight percent of $B_2O_3$; 0 to 16 weight percent of $Al_2O_3$; 0 to 2.5 weight percent of $SiO_2$; 0 to 26 weight percent of BaO; 0 to 20 weight percent of SrO; 23 to 49 weight percent of ZnO; more than 6 weight percent and not more than 20 weight percent of CaO; 0 to 16 weight percent of MgO; not less than 0 weight percent and less than 1 weight percent of $Li_2O$; 3 to 19 weight percent of $Na_2O$; and 0 to 20 weight percent of $K_2O$, where the total weight of BaO, SrO, ZnO, CaO, and MgO and the total weight of $Li_2O$, $Na_2O$ and $K_2O$ are predetermined amounts.

8 Claims, 1 Drawing Sheet

OPTICAL GLASS AND OPTICAL ELEMENT

This application is based on Japanese Patent Application No. 2008-202883 filed on Aug. 6, 2008, in Japanese Patent Office, the entire content of which is hereby incorporated by reference.

TECHNICAL FIELD

The present invention relates to optical glass and an optical element composed of the optical glass, and particularly relates to optical glass which has optical constants of medium refractive index and low dispersion and is suitable for press molding process and to an optical element composed of the optical glass.

BACKGROUND

Various optical elements composed of optical glass such as optical pickup lenses for optical discs and image pickup lenses to be installed in mobile phones are widely utilized. Recently, demands for such the optical elements are rapidly enlarged and rising in the production efficiency and lowering in the cost are required. Consequently, a press molding method has been widely applied for producing such the optical elements. According to the press molding method, the production process has been reduced compared to usual polishing method so that the optical elements can be produced in shorter time and at lower cost.

The press molding method is classified into a re-heating method and a direct press method. In the re-heating method, a gob preform or a polished preform in a shape which is resembles in the final shape of the product is prepared and the preform is re-heated at a temperature not lower than the yield point of the glass and pressed with a pair of upper and lower molds which are heated to obtain the final shape of the product. In the direct press method, a molten glass drop is directly dropped from a glass melting tank onto a heated mold, and the molten glass drop is pressed into the shape of the final product.

In the both methods, the mold is necessarily heated at a temperature near or higher than the glass transition temperature Tg of the optical glass to be formed, when the glass is pressed with the mold. Consequently, surface oxidation or changing in the metal composition of the mold tends to be caused when the glass transition temperature Tg of the optical glass is higher so that the lifetime of the mold is shortened and the cost is raised. A method for inhibiting such the deterioration of the mold can be considered, in which the molding is performed under an atmosphere of inactive gas such as nitrogen. However, the production cost is raised in such the method since the molding apparatus is made complicate for controlling the atmosphere and running cost of the inactive gas is necessary.

Therefore, glass with a glass transition temperature Tg as low as possible is preferable as optical glass to be used in the press molding method. Moreover, it is preferable from the viewpoint of working environment at the production that $PbO$, $As_2O_3$, $TeO_2$, $Sb_2O_3$ and fluoride components are not contained in the optical glass.

From the above viewpoints, some kinds of glass having medium refractive index, low dispersion and low glass transition temperature Tg are proposed; cf. Patent Publications 1 to 5, for example.

Patent Publication 1: JP-A 2004-217513
Patent Publication 2: JP-A 2007-145613
Patent Publication 3: JP-A Hei 2-124743
Patent Publication 4: JP-A 2002-211949
Patent Publication 5: JP-A 2005-53749

However, component ratios of the optical glasses described in the above Patent Publications 1 to 5 are decided from viewpoint of lowering the glass transition temperature Tg as the most important matter and such the glasses have a drawback that the toughness is low (fragile). Therefore, cracks are easily caused by a shock given on the occasion of press molding or in the post-processing such as centering carried out after the press molding process.

SUMMARY

The present invention is attained on the above-mentioned background, and provides optical glass with optical constants of medium refractive index and low dispersion, in which glass transition temperature Tg is low and cracks are hardly caused, and an optical element composed of such the optical glass.

There is provided an optical glass comprising, based on a total weight of the optical glass: not less than 35 weight percent and less than 45 weight percent of $P_2O_5$; not less than 0.5 weight percent and less than 10 weight percent of $B_2O_3$; 0 to 16 weight percent of $Al_2O_3$; 0 to 2.5 weight percent of $SiO_2$; 0 to 26 weight percent of BaO; 0 to 20 weight percent of SrO; 23 to 49 weight percent of ZnO; more than 6 weight percent and not more than 20 weight percent of CaO; 0 to 16 weight percent of MgO; not less than 0 weight percent and less than 1 weight percent of $Li_2O$; 3 to 19 weight percent of $Na_2O$; and 0 to 20 weight percent of $K_2O$. In the optical glass, the total weight of BaO, SrO, ZnO, CaO, and MgO is not more than 55 weight percent based on the total weight of the optical glass, and the total weight of $Li_2O$, $Na_2O$ and $K_2O$ is not more than 24 weight percent based on the total weight of the optical glass.

These and other objects, features and advantages according to the present invention will become more apparent upon reading of the following detailed description along with the accompanied drawings.

BRIEF DESCRIPTION OF DRAWINGS

Embodiments will now be described, by way of example only, with reference to the accompanying drawings which are meant to be exemplary, not limiting, and wherein like elements numbered alike in a FIGURE, in which.

DESCRIPTION OF EMBODIMENTS

Figure 1:
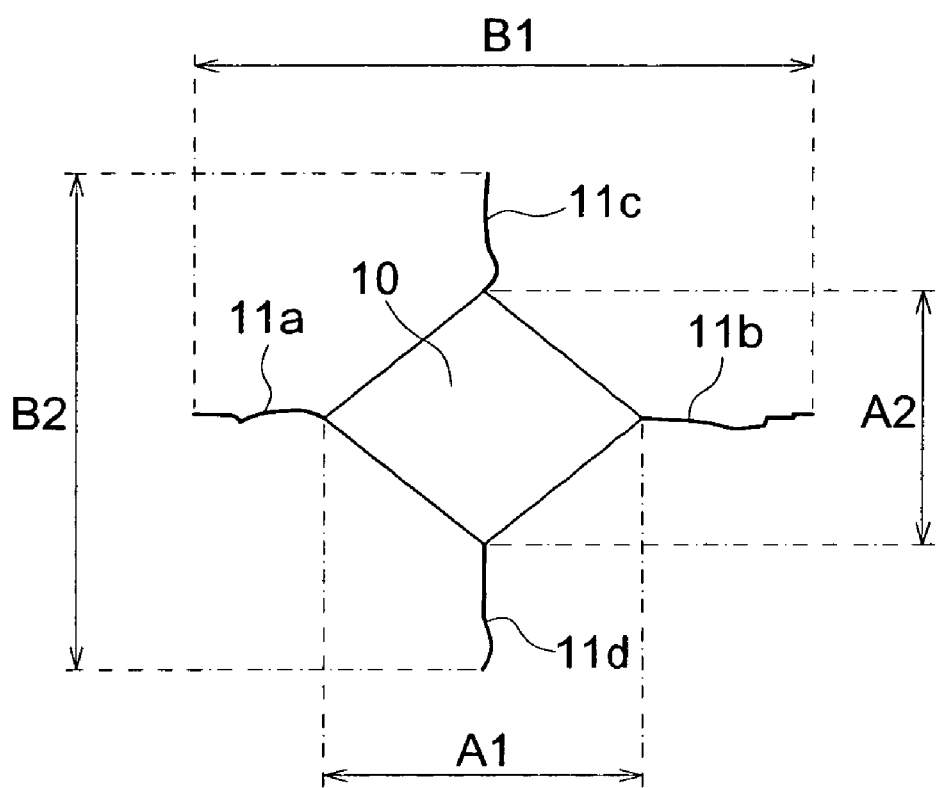
FIG. 1 shows a schematic diagram of a Vickers impression.

A preferred embodiment of the present invention will be described below.

An optical glass as a preferred embodiment contains predetermined components by a predetermined ratio of combination. Therefore, the optical glass has optical constants of medium refractive index and low dispersion, and properties that glass transition temperature Tg is low and cracks are hardly caused. It enables to manufacture optical elements with high production efficiency and low cost by a press molding method.

It is found by the investigation for attaining the above object by the inventor that the glass transition temperature Tg can be lowered without largely lowering in the toughness while sustaining the designated optical constants by raising the content of ZnO in $P_2O_5$ type glass. As a result of further investigation, it is cleared that the toughness can be largely improved by limiting the total amount of $R'_2O$ (R': Li, Na, and K) while inhibiting the content of $Li_2O$ into less than 1 weight percent. The invention is attained on the discovery that the glass having the lowered glass transition temperature Tg, high toughness and high difficultly of cracking can be obtained by adding the designated amount of $B_2O_3$ to the above-described condition. Moreover, CaO in an amount of more than 6 weight percent is added for improving the weather resistivity. It is preferable from the viewpoint of working environment at the production that any of PbO, $As_2O_3$, $TeO_2$, $Sb_2O_3$ and fluoride components is not contained in the optical glass.

The optical glass of the present embodiment has optical constants of medium refractive index and low dispersion, lowered glass transition temperature Tg, and a property that cracks are difficultly formed (high toughness) since the components are contained in the designated ratios, respectively. The optical glass preferably has a refractive index nd in the range from 1.55 to 1.62 and an Abbe number vd in the range from 58 to 62 and a glass transition temperature Tg of not higher than 450° C. When the following value L1/L2 is used as the index for expressing the difficulty of crack formation (degree of toughness), the value of L1/L2 is preferably 0.38 or more.

(Calculation of L1/L2)

In this specification, the value of L1/L2 is used as the indicator of the difficulty of cracks formation (degree of toughness). The value of L1/L2 is a ratio of a diagonal length L1 of an impression given by pushing a Vickers indenter into the optical glass to the length L2 of cracks extending from four corners of the impression, where values L1 and L2 are obtained by the following expressions.

$$L1=(A1+A2)/2 \quad (1)$$

$$L2=(B1+B2)/2 \quad (2)$$

In the expression (1), A1 and A2 are diagonal lengths of the impression along two directions perpendicular to each other. In the expression (2), B1 is a distance between the opposing ends of the two cracks extending along the direction of A1, and B2 is a distance between the opposing ends of the two cracks extending along the direction of A2.

FIG. 1 shows a schematic diagram of an impression formed by pushing a Vickers indenter onto a surface of the glass (Vickers impression 10). Cracks 11a through 11d extend from the four corners of the Vickers impression 10, respectively. The diagonal lengths of the Vickers impression 10 along the two directions perpendicular to each other (A1, A2), the distance B1 between the opposing ends of the two cracks (11a, 11b) extending in the A1 direction and the distance B2 between the opposing ends of the two cracks (11c, 11d) extending in the A2 direction are measured as shown in FIG. 1. Then, the values of L1 and L2 are calculated according to the above expressions. As is understood from the above expressions, the value of L1/L2 may be a value of from 0 to 1 and is neared to 1 accompanied with raising the difficulty of crack formation.

(Glass Composition)

The reason of decision of the above contents of the optical glass components in the present embodiment is described in detail below. In the followings, the content of each component is expressed as that based on the total weight of the glass.

$P_2O_5$ is a component to form a skeleton of the glass (glass former) and the glass is made instable and tendency of devitrification is strongly caused when the content of that is less than 35 weight percent. Besides, the required optical constant cannot be obtained and the weather resistivity is considerably deteriorated when the content of $P_2O_5$ becomes 45 weight percent or more. Consequently, the content of $P_2O_5$ is necessarily in a range from 35 to 45 weight percent, where the range excludes 45 weight percent, namely, in the range of not less than 35 weight percent and less than 45 weight percent. In such the range, 40 to 44.5 weight percent is more preferable.

$B_2O_3$ is effective for stabilizing the glass and raising the toughness (L1/L2) so as to raise the difficulty of crack occurrence, and the content of that is necessarily not less than 0.5 weight percent. $B_2O_3$ is also effective for lowering the line expansion coefficient. On the other hand, the glass transition temperature is raised and the resistance to devitrification is lowered when the content is not less than 10 weight percent. Therefore, the content of $B_2O_3$ is necessarily in a range from 0.5 to 10 weight percent, where the range excludes 10 weight percent, namely, not less than 0.5 weight percent and less than 10 weight percent. In such the range, the range from 1 to 5 weight percent is more preferable.

$Al_2O_3$ is effective for lowering the line expansion coefficient and raising the weather resistivity. However, the glass transition temperature Tg is raised and the stability of the glass is lowered so as to lower the resistance to devitrification when the content of $Al_2O_3$ exceeds 16 weight percent. Accordingly, the content of $Al_2O_3$ is necessarily within the range from 0 to 16 weight percent, where the range includes 0 weight percent. In such the range, the range from 1 to 6 weight percent is more preferable.

$SiO_2$ is effective for lowering the refractive index nd and raising the weather resistivity. However, non-dissolved matter tends to be left in the glass when the content of $SiO_2$ exceeds 2.5 weight percent. Therefore, the content of $SiO_2$ is necessarily within the range of from 0 to 2.5 weight percent, where the range includes 0 weight percent.

BaO is effective for increasing the refractive index nd and raising stability of the glass. However, the line expansion coefficient becomes excessively high when the content of BaO exceeds 26 weight percent. Therefore, the content of BaO is necessarily within the range of from 0 to 26 weight percent, where the range includes 0 weight percent. In such the range, the range of from 1 to 15 weight percent is more preferable.

SrO is effective for stabilizing the glass. However, the glass is made instable and tendency of devitrification is increased when the content of SrO exceeds 20 weight percent. Therefore, the content of SrO is necessarily within the range from 0 to 20 weight percent, where the range includes 0 weight percent. In such the range, the range from 0 to 10 weight percent is more preferable, where the range includes 0 weight percent.

ZnO is effective for lowering the glass transition temperature Tg without excessively lowering the toughness (L1/L2), and does not raise the line expansion coefficient. The effect of lowering the glass transition temperature Tg cannot sufficiently obtained when the content of ZnO is less than 23 weight percent. On the other hand, the stability of the glass is lowered so as to raise tendency of devitrification when the content of ZnO exceeds 49 weight percent. Therefore, the content of ZnO is necessarily within the range from 23 to 49 weight percent. In such the range, the range from 23.5 to 38 weight percent is more preferable.

CaO is effective for lowering the line expansion coefficient and improving the chemical durability and the weather resistivity of the glass. Such the effects cannot be sufficiently obtained when the content of CaO is not more than 6 weight percent. Besides, the glass transition temperature is raised, the glass is made instable so as to raise the tendency of devitrification, and the toughness (L1/L2) is lowered, when the content of CaO exceeds 20 weight percent. Therefore, the content of CaO is necessarily within the range from 6 to 20 weight percent, where the range excludes 6%, namely, more than 6 weight percent and not more than 20 weight percent. In such the range, the range of from 6.5 to 10 weight percent is more preferable, where the range includes 0 weight percent.

MgO is effective for decreasing the line expansion coefficient and improving the weather resistivity of the glass. However, the glass is made instable so as to raise the tendency of devitrification and the toughness (L1/L2) is lowered, when the content of MgO exceeds 16 weight percent. Therefore, the content of MgO is necessarily within the range from 0 to 16 weight percent, where the range includes 0 weight percent. In such the range, the range of from 0 to 7 weight percent is more preferable, where the range includes 0 weight percent.

When the total content of the RO components (BaO, SrO, ZnO, CaO and MgO) exceeds 55 weight percent, the glass is made instable so as to raise the tendency of devitrification. Therefore, the total content of RO components is necessarily not more than 55 weight percent, more preferably not more than 48 weight percent.

$Li_2O$ is strongly effective for lowering the glass transition temperature Tg. However, the toughness (L1/L2) of the glass is considerably lowered when the content of $Li_2O$ is 1 weight percent or more. Moreover, the line expansion coefficient is increased and the weather resistivity of the glass is considerably deteriorated. Therefore, the content of $Li_2O$ is necessarily within the range from 0 to 1 weight percent, where the range includes 0 and excludes 1 weight percent, namely, not less than 0 weight percent and less than 1 weight percent. In such the range, the range from 0.2 to 0.6 weight percent is more preferable.

$Na_2O$ is effective for lowering the glass transition temperature Tg and the necessary adding amount is not less than 3 weight percent. Besides, the toughness (L1/L2) and the chemical durability are lowered when the content of $Na_2O$ exceeds 19 weight percent. Therefore, the content of $Na_2O$ is necessarily within the range from 3 to 19 weight percent. In such the range, the range of from 3.5 to 10 weight percent is more preferable.

$K_2O$ also is effective for lowering the glass transition temperature Tg in like manner as $Na_2O$. However, the toughness (L1/L2) is lowered together with lowering in the resistance to devitrification, when the content of $K_2O$ exceeds 20 weight percent. Therefore, the content of $K_2O$ is necessarily within the range from 0 to 20 weight percent, where the range includes 0 weight percent. In such the range, the range from 1 to 10 weight percent is more preferable.

When the total content of $R'_2O$ components ($Li_2O$, $Ma_2O$ and $K_2O$) exceeds 24 weight percent, the toughness (L1/L2) is lowered and the weather resistivity is deteriorated. Therefore, the total content of $R'_2O$ components is necessarily not more than 24 weight percent, more preferably not more than 12 weight percent.

$TiO_2$ is effective for raising the refractive index nd and stabilizing the glass. However, the Abbe number vd is decreased in some cases so as to difficultly obtain the required optical constants and possibility of coloring of the glass is caused, when the content of $TiO_2$ is exceeds 5 weight percent. Therefore, the content of $TiO_2$ is preferably from 0 to 5 weight percent, where the range includes 0 and excludes 5 weight percent, namely, not less than 0 weight percent and less than 5 weight percent.

$ZrO_2$ is effective for controlling the optical constants and improving the weather resistivity. In some cases, however, the designated Abbe number is difficulty maintained when the content of $ZrO_2$ exceeds 10 weight percent. Therefore, the content of $ZrO_2$ is preferably in the range from 0 to 10 weight percent, where the range includes 0 weight percent.

$Ta_2O_5$ is effective for controlling the optical constants and improving the chemical durability. However, the glass is made instable so as to increase the tendency of devitrification is increased in some cases, when the content of $Ta_2O_5$ exceeds 10 weight percent. Therefore, the content of $Ta_2O_5$ is preferably in the range from 0 to 10 weight percent, where the range includes 0 weight percent.

Among the components usually used in optical glass, components other than the above-described such as $La_2O_3$, MnO, $Nb_2O_3$, $Bi_2O_3$ and $WO_3$ are preferably not contained in the optical glass of the embodiment. However, presence of such the components in an amount such that the components do not influence to the glass properties is permitted. In such the case, the total content of $P_2O_5$, $B_2O_3$, $Al_2O_3$, $SiO_2$, BaO, SrO, ZnO, CaO, MgO, $Li_2O$, $Na_2O$, $K_2O$, $TiO_2$, $ZrO_2$ and $Ta_2O_5$ is preferably not less than 98 weight percent, more preferably not less than 99 weight percent, and further preferably not less than 99.9 weight percent.

It is preferable for considering the working environment of the production and keeping the safety of workers that any of PbO, $As_2O_3$, $TeO_2$ and fluoride compounds is not contained in the optical glass.

(Optical Element)

The optical element of the present embodiment is composed of the above-described optical glass and applicable as, for example, optical pickup lenses for optical discs, image pickup lenses to be mounted into digital cameras or mobile phones, collimating lenses of laser beam printers and various mirrors and prisms.

As above-mentioned, optical elements can be produced with high production efficiency and lowered cost by a press molding method since the optical glass of the present embodiment has the properties suitable for the press molding method such as the low glass transition temperature and the high difficulty of crack occurrence (high L1/L2 value). There is no specific limitation on the method for press molding and the production may be carried out according to known methods. The press molding method may be either the re-heating method or the direct press method. Optical elements can be produced with higher production efficiency by the direct press method.

In the direct press method, it is necessary that the mold is previously heated at a designated temperature so as to suitable optical surface is transferred to the optical element. The temperature is usually set near the glass transition temperature Tg of the optical glass even though the temperature is varied depending on the various conditions such as the shape and size of the optical element to be produced. Therefore, the temperature of the mold is necessarily raised accompanied with the raising of the glass transition temperature Tg of the optical glass so that the deterioration of the mold is accelerated. The glass transition temperature of the optical glass is preferably as low as possible from the viewpoint of inhibiting the deterioration of the mold. The optical glass of the present embodiment has a merit that the deterioration of the mold can be effectively inhibited and optical elements can be produced with high production efficiency since the optical glass has very low glass transition temperature Tg.

In the direct press method, a molten glass drop is dropped onto a lower mold and is shaped by being pressed between a pair of upper and lower molds. The molten glass drop is rapidly cooled and solidified to be formed into an optical element by heat radiation mainly through its contacting surface with the molds. The optical glass of the present embodiment has a merit that cracks are difficultly caused even when the glass suffers impression by pressing or drastic temperature variation on the occasion of press molding since the optical glass is high in the toughness (L1/L2).

EXAMPLES

The above embodiment is described in detail below referring examples. The present invention is not limited to the examples.

Thirty kinds of optical glass (Examples 1 to 30) each having components in a combination ratio satisfying the above-described ranges, and five kinds of optical glass (Comparative Examples 1 and 5) each having components out of the above-described ranges were prepared according to the procedure described below. The glass compositions of Examples 1 through 30 are listed in Tables 1 through 3 and those of Comparative Examples 1 through 5 are listed in Table 4. The Comparative Example 1 was tracing of Example 11 described in JP-A No. 2004-217513 and Comparative Example 2 was that of Example 9 described in JP-A No. 2007-145613. The Comparative Example 3 was tracing of Example 4 described in JP-A No. Hei 2-124743, Comparative Example 4 was that of Example 4 described in JP-A No. 2002-211949, and Comparative Example 5 was that of Example 3 described in JP-A No. 2005-53749.

TABLE 1

| | | Example | | | | | | | | | |
|---|---|---|---|---|---|---|---|---|---|---|---|
| | | 1 | 2 | 3 | 4 | 5 | 6 | 7 | 8 | 9 | 10 |
| Composition (Weight-%) | $P_2O_5$ | 44.00 | 44.50 | 44.50 | 44.50 | 44.50 | 44.00 | 44.01 | 44.01 | 44.08 | 44.05 |
| | $Al_2O_3$ | 3.50 | 3.00 | 3.00 | 3.00 | 3.00 | 3.00 | 3.00 | 3.00 | 3.00 | 3.00 |
| | $B_2O_3$ | 0.50 | 2.00 | 2.50 | 2.50 | 2.50 | 2.50 | 3.00 | 2.80 | 3.00 | 2.80 |
| | $SiO_2$ | | | | | | | | | | |
| | BaO | 3.00 | 3.00 | 3.00 | 3.00 | 3.00 | 3.00 | 3.00 | 3.00 | 2.50 | 2.70 |
| | SrO | | | | | | | | | | |
| | ZnO | 34.50 | 33.00 | 32.00 | 32.00 | 32.50 | 32.50 | 32.00 | 32.20 | 32.50 | 32.50 |
| | CaO | 6.50 | 6.50 | 6.50 | 6.50 | 6.50 | 6.50 | 6.50 | 6.50 | 6.50 | 6.50 |
| | MgO | | | | | | | | | | |
| | $Na_2O$ | 3.60 | 5.60 | 6.10 | 5.60 | 5.60 | 6.05 | 6.65 | 6.41 | 6.49 | 6.32 |
| | $Li_2O$ | 0.40 | 0.40 | 0.40 | 0.60 | 0.40 | 0.40 | 0.40 | 0.40 | 0.40 | 0.40 |
| | $K_2O$ | 4.00 | 2.00 | 2.00 | 2.30 | 2.00 | 2.05 | 1.44 | 1.68 | 1.53 | 1.73 |
| | $ZrO_2$ | | | | | | | | | | |
| | $Ta_2O_5$ | | | | | | | | | | |
| | $TiO_2$ | | | | | | | | | | |
| | Total | 100.00 | 100.00 | 100.00 | 100.00 | 100.00 | 100.00 | 100.00 | 100.00 | 100.00 | 100.00 |
| | Total content of RO | 44.00 | 42.50 | 41.50 | 41.50 | 42.00 | 42.00 | 41.50 | 41.70 | 41.50 | 41.70 |
| | Total content of $R'_2O$ | 8.00 | 8.00 | 8.50 | 8.50 | 8.00 | 8.50 | 8.49 | 8.49 | 8.42 | 8.45 |
| nd | | 1.58610 | 1.58729 | 1.58533 | 1.58570 | 1.58674 | 1.58618 | 1.58617 | 1.58600 | 1.58609 | 1.58608 |
| vd | | 59.2 | 59.6 | 59.6 | 59.6 | 59.9 | 59.7 | 59.8 | 59.7 | 59.8 | 59.6 |
| Tg(° C.) | | 403 | 411 | 410 | 404 | 415 | 414 | 418 | 416 | 417 | 416 |
| L1/L2 | | 0.39 | 0.40 | 0.39 | 0.39 | 0.42 | 0.39 | 0.39 | 0.41 | 0.41 | 0.40 |

TABLE 2

| | | Example | | | | | | | | | |
|---|---|---|---|---|---|---|---|---|---|---|---|
| | | 11 | 12 | 13 | 14 | 15 | 16 | 17 | 18 | 19 | 20 |
| Composition (Weight-%) | $P_2O_5$ | 44.07 | 43.70 | 43.72 | 44.50 | 44.50 | 44.50 | 44.00 | 43.50 | 43.50 | 43.50 |
| | $Al_2O_3$ | 3.00 | 3.78 | 3.72 | 3.00 | 3.74 | 3.00 | 3.00 | 3.00 | 3.00 | 3.00 |
| | $B_2O_3$ | 2.50 | 2.50 | 2.50 | 2.50 | 1.76 | 2.03 | 2.50 | 2.50 | 2.50 | 2.50 |
| | $SiO_2$ | | | | | | | 0.50 | | | |
| | BaO | 2.50 | 3.00 | 3.00 | 3.00 | 3.00 | 3.00 | 3.00 | 3.00 | 3.00 | 3.00 |
| | SrO | | | | | | | | | | |
| | ZnO | 33.00 | 32.50 | 32.50 | 32.04 | 32.50 | 32.50 | 32.50 | 32.50 | 32.50 | 32.50 |
| | CaO | 6.50 | 6.50 | 6.50 | 6.50 | 6.50 | 6.50 | 6.50 | 6.50 | 6.50 | 6.50 |
| | MgO | | | | | | | | | | |
| | $Na_2O$ | 5.89 | 5.55 | 5.60 | 6.80 | 5.90 | 6.25 | 5.60 | 5.60 | 5.60 | 5.60 |
| | $Li_2O$ | 0.40 | 0.40 | 0.40 | 0.40 | 0.40 | 0.40 | 0.40 | 0.40 | 0.40 | 0.40 |
| | $K_2O$ | 2.14 | 2.06 | 2.06 | 1.26 | 1.70 | 1.82 | 2.00 | 2.00 | 2.00 | 2.00 |
| | $ZrO_2$ | | | | | | | | 1.00 | | |
| | $Ta_2O_5$ | | | | | | | | | 1.00 | |
| | $TiO_2$ | | | | | | | | | | 1.00 |
| | Total | 100.00 | 100.00 | 100.00 | 100.00 | 100.00 | 100.00 | 100.00 | 100.00 | 100.00 | 100.00 |
| | Total content of RO | 42.00 | 42.00 | 42.00 | 41.54 | 42.00 | 42.00 | 42.00 | 42.00 | 42.00 | 42.00 |
| | Total content of $R'_2O$ | 8.43 | 8.02 | 8.06 | 8.46 | 8.00 | 8.47 | 8.00 | 8.00 | 8.00 | 8.00 |
| nd | | 1.58593 | 1.58624 | 1.58629 | 1.58599 | 1.58605 | 1.58588 | 1.58542 | 1.58946 | 1.58924 | 1.59505 |
| vd | | 59.6 | 59.7 | 59.6 | 59.7 | 59.6 | 59.6 | 59.5 | 59.1 | 59.0 | 55.9 |
| Tg(° C.) | | 415 | 422 | 420 | 412 | 412 | 407 | 414 | 418 | 421 | 425 |
| L1/L2 | | 0.42 | 0.44 | 0.42 | 0.43 | 0.42 | 0.43 | 0.41 | 0.43 | 0.40 | 0.42 |

TABLE 3

| | | Example | | | | | | | | | |
|---|---|---|---|---|---|---|---|---|---|---|---|
| | | 21 | 22 | 23 | 24 | 25 | 26 | 27 | 28 | 29 | 30 |
| Composition (Weight-%) | $P_2O_5$ | 35.00 | 40.50 | 41.00 | 41.00 | 44.50 | 44.50 | 43.50 | 44.50 | 43.00 | 44.50 |
| | $Al_2O_3$ | 7.50 | 2.00 | 2.00 | 12.00 | 2.50 | | 2.00 | 2.00 | 2.00 | 2.00 |
| | $B_2O_3$ | 7.50 | 2.00 | 2.00 | 2.00 | 3.00 | 3.00 | 2.00 | 3.00 | 2.50 | 2.50 |
| | $SiO_2$ | | | | | | | | | | |
| | BaO | 3.00 | 19.00 | 3.00 | 3.00 | 3.00 | | 3.00 | 3.00 | 3.00 | 3.00 |
| | SrO | | | 15.00 | | | | | | | |
| | ZnO | 30.50 | 23.00 | 23.00 | 25.50 | 32.50 | 38.00 | 23.00 | 25.00 | 25.00 | 23.50 |
| | CaO | 6.50 | 6.50 | 6.50 | 6.50 | 6.50 | 6.50 | 6.50 | 15.00 | 6.50 | 6.50 |
| | MgO | | | | | | | 12.00 | | | |
| | $Na_2O$ | 7.40 | 5.10 | 5.60 | 8.00 | 5.20 | 8.00 | 5.60 | 5.60 | 3.00 | 13.60 |
| | $Li_2O$ | 0.60 | 0.40 | 0.40 | | 0.80 | | 0.40 | 0.40 | 0.40 | 0.40 |
| | $K_2O$ | 2.00 | 1.50 | 1.50 | 2.00 | 2.00 | | 2.00 | 1.50 | 14.60 | 4.00 |
| | $ZrO_2$ | | | | | | | | | | |
| | $Ta_2O_5$ | | | | | | | | | | |
| | $TiO_2$ | | | | | | | | | | |
| | Total | 100.00 | 100.00 | 100.00 | 100.00 | 100.00 | 100.00 | 100.00 | 100.00 | 100.00 | 100.00 |
| | Total content of RO | 40.00 | 48.50 | 47.50 | 35.00 | 42.00 | 44.50 | 44.50 | 43.00 | 34.50 | 33.00 |
| | Total content Of $R'_2O$ | 10.00 | 7.00 | 7.50 | 10.00 | 8.00 | 8.00 | 8.00 | 7.50 | 18.00 | 18.00 |
| nd | | 1.57986 | 1.60029 | 1.59755 | 1.56383 | 1.58761 | 1.59096 | 1.58795 | 1.59413 | 1.55604 | 1.55821 |
| vd | | 58.2 | 60.1 | 60.5 | 59.6 | 60.0 | 58.7 | 60.9 | 60.6 | 60.8 | 60.2 |
| Tg(° C.) | | 448 | 412 | 422 | 435 | 408 | 428 | 365 | 409 | 322 | 347 |
| L1/L2 | | 0.41 | 0.39 | 0.40 | 0.45 | 0.41 | 0.45 | 0.38 | 0.38 | 0.38 | 0.43 |

TABLE 4

| | | Comparative example | | | | |
|---|---|---|---|---|---|---|
| | | 1 | 2 | 3 | 4 | 5 |
| Composition (Weight-%) | $P_2O_5$ | 44.60 | 47.91 | 45.00 | 42.10 | 43.00 |
| | $Al_2O_3$ | | | 2.00 | 2.10 | 2.50 |
| | $B_2O_3$ | 0.30 | | | 1.70 | 4.50 |
| | $SiO_2$ | | | | | |
| | BaO | 30.70 | 28.82 | 19.00 | 41.00 | |
| | SrO | | | | | |
| | ZnO | 8.50 | 10.06 | 25.00 | | 27.00 |
| | CaO | 1.50 | 1.25 | 5.00 | 4.00 | 11.00 |
| | MgO | | | | | |
| | $Na_2O$ | 5.60 | 3.58 | | | |
| | $Li_2O$ | 2.70 | 1.72 | 4.00 | 4.10 | 2.00 |
| | $K_2O$ | 3.30 | 3.65 | | | 10.00 |
| | $ZrO_2$ | | | | | |
| | $Ta_2O_5$ | | | | | |
| | $TiO_2$ | | | | | |
| | $Bi_2O_3$ | 2.80 | | | | |
| | $Sb_2O_3$ | | 3.00 | | | |
| | $La_2O_3$ | | | | 2.50 | |
| | $Nb_2O_5$ | | | | 2.50 | |
| | Total | 100.00 | 100.00 | 100.00 | 100.00 | 100.00 |
| | Total content of RO | 40.70 | 40.13 | 49.00 | 45.00 | 38.00 |
| | Total content of $R'_2O$ | 11.60 | 8.95 | 4.00 | 4.10 | 12.00 |
| nd | | 1.58359 | 1.58300 | 1.61284 | 1.62100 | 1.57754 |
| vd | | 59.7 | 59.4 | 60.7 | 60.0 | 60.9 |
| Tg(° C.) | | 326 | 320 | 396 | 451 | 425 |
| L1/L2 | | 0.33 | 0.34 | 0.34 | 0.33 | 0.34 |

First, usual powdered raw materials of glass such as oxides, carbonates, nitrates and phosphates were satisfactorily mixed as they are in a condition of powder, to prepare a mixed glass material with the glass composition listed in the Tables 1 through 4. The mixed glass material was put into a melting tank heated at a temperature from 900° C. to 1,300° C. and was melted, cleaned and unified by stirring. Then, the mixed glass material was molded into a previously heated iron mold and gradually cooled to prepare samples.

Next, prepared samples were subjected to measurement of refractive index nd, Abbe number vd, glass transition temperature Tg, and toughness (L1/L2). Measured results are listed in Table 1 through 4.

The refractive index nd, Abbe number vd and glass transition temperature Tg were measured according to the testing method prescribed in Japanese Optical Glass Industrial Standards (JOGIS). The refractive index nd and the Abbe number vd were measured after a glass block was molded as described above and was gradually cooled to the room temperature (25° C.) at a cooling rate of −2.3° C. per hour to obtain samples. The measurements of the samples were carried out by using a measuring apparatus KPR-200 manufactured by Kalnew Optical Industrial Co., Ltd. The glass transition temperature Tg was measured by a thermomechanical analyzer TMA/SS6000 manufactured by Seiko Instruments Inc. at a temperature rising rate of 10° C. per minute. As for the toughness (L1/L2), a Vickers impression was formed with a micro-Vickers hardness tester HM-112 manufactured by AKASHI Corporation with a loading duration of 15 seconds and a loading of 10 gf, then, diagonal lengths of the impression and lengths of cracks extending from four corners of the impression were measured with an optical microscope to calculate the value of L1/L2.

As shown in Tables 1 through 3, the optical glass of Examples 1 through 30 each has a refractive index nd within the range from 1.55 to 1.62 and an Abbe number vd within the range of from 55 to 62. Moreover, the glass transition temperature of each of the samples was not more than 450° C. and the value of L1/L2 is 0.38 or more. Accordingly, it was confirmed that the optical elements could be produced with excellent properties.

In contrast, each of the optical glass of Comparative Examples 1 through 5 in Table 4 shows the value L1/L2 of 0.34 or less, which exhibits insufficient toughness.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An optical glass comprising, based on a total weight of the optical glass:
   not less than 35 weight percent and less than 45 weight percent of $P_2O_5$;
   not less than 0.5 weight percent and less than 10 weight percent of $B_2O_3$;
   0 to 16 weight percent of $Al_2O_3$;
   0 to 2.5 weight percent of $SiO_2$;
   0 to 26 weight percent of BaO;
   0 to 20 weight percent of SrO;
   23 to 38 weight percent of ZnO;
   more than 6 weight percent and not more than 20 weight percent of CaO;
   0 to 16 weight percent of MgO;
   0 or more weight percent and less than 1 weight percent of $Li_2O$;
   3 to 19 weight percent of $Na_2O$; and
   0 to 20 weight percent of $K_2O$,
   wherein a total weight of BaO, SrO, ZnO, CaO, and MgO is not more than 55 weight percent based on the total weight of the optical glass,
   a total weight of $Li_2O$, $Na_2O$ and $K_2O$ is not more than 24 weight percent based on the total weight of the optical glass, and
   a total content of $P_2O_5$, $B_2O_3$, $Al_2O_3$, $SiO_2$, BaO, SrO, ZnO, CaO, MgO, $Li_2O$, $Na_2O$, $K_2O$, $TiO_2$, $ZrO_2$ and $Ta_2O_5$ is not less than 99 weight percent based on the total weight of the optical glass.

2. The optical glass of claim 1 further comprising, based on the total weight of the optical glass:
   0 or more weight percent and less than 5 weight percent of $TiO_2$;
   0 to 10 weight percent of $ZrO_2$; and
   0 to 10 weight percent of $Ta_2O_5$.

3. The optical glass of claim 1,
   wherein the optical glass does not comprise PbO, $As_2O_3$, $TeO_2$, $Sb_2O_3$, and fluoride.

4. The optical glass of claim 1,
   wherein a refractive index nd of the optical glass is in a range of 1.55 to 1.62,
   an Abbe number vd of the optical glass is in a range of 55 to 62,
   a glass transition temperature Tg of the optical glass is not higher than 450° C., and
   a value calculated by dividing a value L1 by a value L2 (L1/L2) is 0.38 or more,
   where L1 is a diagonal length of an impression given by pushing a Vickers indenter into the optical glass and is defined as L1=(A1+A2)/2,
   A1 and A2 are diagonal lengths of the impression along two directions perpendicular to each other,
   L2 is a length of cracks extending from four corners of the impression, and is defined as L2=(B1+B2)/2,
   B1 is a distance between opposing ends of two of the cracks extending along a direction of A1, and
   B2 is a distance between opposing ends of two of the cracks extending along a direction of A2.

5. An optical element comprising an element body comprising the optical glass of claim 1.

6. The optical element of claim 5,
   wherein the element body is formed by pressing the optical glass with a mold.

7. The optical glass of claim 1,
   wherein the optical glass comprises 0 to 19.0 weight percent of BaO.

8. The optical glass of claim 1,
   wherein the optical glass does not comprise $Nb_2O_3$.

* * * * *